(12) United States Patent
Traverso

(10) Patent No.: US 7,252,011 B2
(45) Date of Patent: Aug. 7, 2007

(54) SURFACE AREA DEPOSITION TRAP

(75) Inventor: Robert Traverso, Belmont, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 10/095,143

(22) Filed: Mar. 11, 2002

(65) Prior Publication Data
US 2003/0167852 A1 Sep. 11, 2003

(51) Int. Cl.
G01L 9/12 (2006.01)

(52) U.S. Cl. .............. 73/756; 73/715; 73/718; 73/724; 361/283.4

(58) Field of Classification Search ........... 73/756, 73/724, 715–718, 706; 210/108, 87, 295, 210/301, 300, 323; 600/485
See application file for complete search history.

(56) References Cited

U.S. PATENT DOCUMENTS

| | | | |
|---|---|---|---|
| 3,371,537 A | 3/1968 | Kiene | |
| 3,675,072 A | 7/1972 | Hahn et al. | 315/111 |
| 4,020,674 A | 5/1977 | Fechter et al. | 73/40.5 |
| 4,184,966 A * | 1/1980 | Pall | 210/493.2 |
| 4,714,464 A | 12/1987 | Newton | |
| 4,785,669 A | 11/1988 | Benson et al. | |
| 4,851,015 A * | 7/1989 | Wagner et al. | 55/20 |
| 4,920,805 A | 5/1990 | Yajima et al. | 73/706 |
| 4,973,458 A * | 11/1990 | Newby et al. | 423/244.07 |
| 5,271,277 A | 12/1993 | Pandorf | 73/724 |
| 5,315,877 A * | 5/1994 | Park et al. | 73/724 |
| 5,333,637 A * | 8/1994 | Gravel | 137/83 |
| 5,348,568 A * | 9/1994 | Oda et al. | 95/14 |
| 5,456,945 A | 10/1995 | McMillan et al. | |
| 5,497,620 A * | 3/1996 | Stobbe | 60/303 |
| 5,759,923 A | 6/1998 | McMillan et al. | |
| 5,808,206 A | 9/1998 | Pandorf et al. | 73/756 |
| 5,811,685 A | 9/1998 | Grudzien, Jr. | |
| 5,868,159 A | 2/1999 | Loan et al. | |
| 5,911,162 A | 6/1999 | Denner | 73/718 |
| 5,939,639 A | 8/1999 | Lethbridge | |
| 5,948,169 A | 9/1999 | Wu | |
| 6,024,044 A | 2/2000 | Law et al. | |
| 6,052,176 A | 4/2000 | Ni et al. | |
| 6,084,745 A | 7/2000 | Slezak | |
| 6,105,436 A | 8/2000 | Lischer et al. | 73/724 |

(Continued)

FOREIGN PATENT DOCUMENTS

DE 4207951 9/1993

OTHER PUBLICATIONS

U.S. Appl. No. 60/357,013 Entitled "A Compact Vacuum Cold Strap for Preventing Volatile Material from Condensing on the Sense Element of a Pressure Measurement Device".

(Continued)

Primary Examiner—Daniel J. Colilla
Assistant Examiner—Marissa Ferguson-Samreth
(74) Attorney, Agent, or Firm—Wilmer Cutler Pickering Hale and Dorr LLP

(57) ABSTRACT

The disclosed pressure transducer assembly includes a housing, a pressure sensor disposed within the housing, a coupling establishing a sealed pathway between the housing and an external source of gas or fluid, and a deposition trap disposed in the pathway. The deposition trap provides a plurality of channels, each of the channels being narrower than the pathway.

36 Claims, 8 Drawing Sheets

U.S. PATENT DOCUMENTS

| | | |
|---|---|---|
| 6,206,971 B1 | 3/2001 | Umotoy et al. |
| 6,216,726 B1 | 4/2001 | Brown et al. |
| 6,315,734 B1 * | 11/2001 | Nunome .................... 600/500 |
| 6,382,031 B1 | 5/2002 | Mast et al. |
| 6,407,009 B1 | 6/2002 | You et al. |
| 6,443,015 B1 | 9/2002 | Poulin et al. |
| 6,451,159 B1 | 9/2002 | Lombardi et al. |
| 6,468,329 B2 | 10/2002 | Cho et al. |
| 6,901,808 B1 | 6/2005 | Sharpless et al. |
| 2001/0004879 A1 | 6/2001 | Umotoy et al. |

OTHER PUBLICATIONS

Kiesling, Robert A., *J. Vac. Sci. Technol.*, "Precision Molecular flow Measurement and Control for Single and Multigas Systems" 15(2), pp. 771-774, 1978.

MKS Instruments, Inc., *Application Note*, "Selection of MKS Flow Elements for Flow Measurement and Control", Jan. 1980.

* cited by examiner

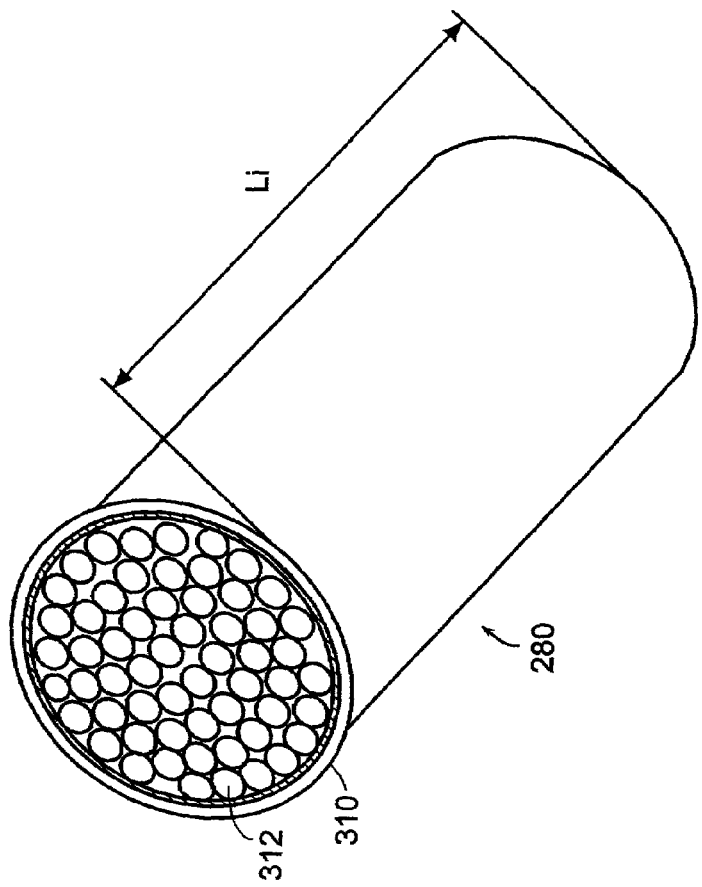
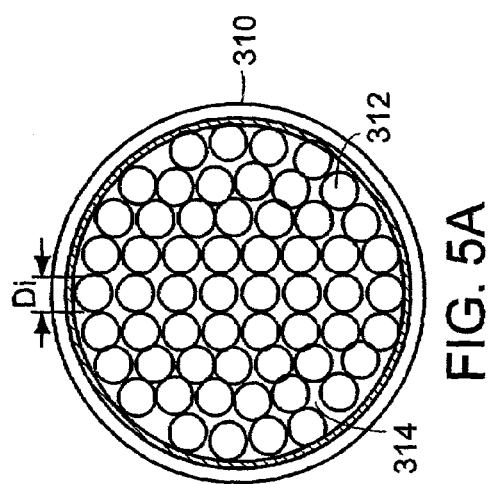
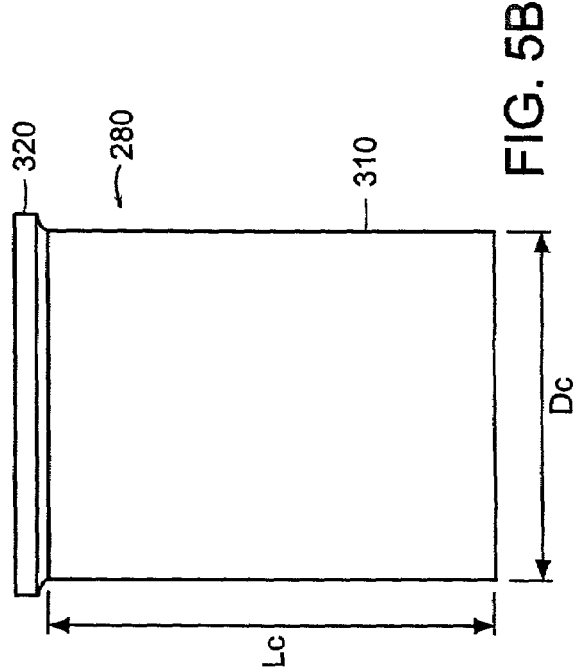

SURFACE AREA DEPOSITION TRAP

BACKGROUND OF THE INVENTION

FIG. 1A shows a sectional side view of a prior art capacitive pressure transducer 100. For convenience of illustration, FIG. 1A, as well as other figures in the present disclosure, are not drawn to scale. As shown, transducer 100 includes a housing 102, a capacitive pressure sensor 106 disposed within housing 102, an inlet tube 104, and a filtering mechanism 108. For convenience of illustration, many details of transducer 100 are omitted from FIG. 1A. However, such sensors are well known and are described for example in U.S. Pat. Nos. 5,911,162 and 6,105,436 and U.S. patent application Ser. Nos. 09/394,804 and 09/637,980.

Briefly, transducer 100 is normally coupled to a gas line, or some other external source of gas or fluid, 110 by a coupling 112. In operation, sensor 106 generates an output signal representative of the pressure within the external source 110.

Pressure transducers such as transducer 100 are often used in integrated circuit fabrication foundries, for example, to measure the pressure of a fluid in a gas line that is being delivered to a deposition chamber, or to measure the pressure within the deposition chamber itself. Some of the processes used in integrated circuit fabrication, such as the etching of aluminum, tend to generate a large volume of particles or contaminants. It is generally desirable to prevent such contaminants from entering the sensor 106. When contaminants do enter, or become built up in, sensor 106 the accuracy of the pressure measurement provided by transducer 100 is adversely affected. Accordingly, prior art pressure transducers have used a variety of mechanisms to prevent contaminants from reaching the sensor 106. Such prior art filtering mechanisms are generally permanently fixed to the housing 102 of the transducer, are disposed between the inlet tube 104 and the sensor 106, and are indicated generally in FIG. 1A at 108.

FIG. 1B shows a more detailed view of a particular prior art pressure transducer 100 showing both the sensor 106 (which as discussed below includes elements 120, 122, 124) and the filtration mechanism 108 (which as discussed below includes elements 140, 150). The housing of transducer 100 includes two housing members 102a and 102b, which are separated by a relatively thin, flexible conducting diaphragm 160. Housing member 102b and diaphragm 160 define a sealed interior chamber 120. Housing member 102a and diaphragm 160 define an interior chamber 130 that opens into inlet tube 104. Diaphragm 160 is mounted so that it flexes, or deflects, in response to pressure differentials in chambers 120, 130.

Transducer 100 includes an electrode disk 122 disposed within chamber 120. Electrode disk 122 is supported within chamber 122 by a support 124. One or more conductors 126 are disposed on the bottom of electrode disk 122 and conductor 126 is generally parallel to and spaced apart from diaphragm 160. Diaphragm 160 and conductor 126 define a capacitor 128. The capacitance of capacitor 128 is determined in part by the gap between diaphragm 160 and conductor 126. As diaphragm 160 flexes in response to changes in the differential pressure between chambers 120, 130, the capacitance of capacitor 128 changes and thereby provides an indication of the differential pressure.

In operation, a reference pressure, which may be near vacuum, is normally provided in chamber 120, inlet tube 104 is connected via coupling 112 to a gas line, or other external source of fluid or gas, 110, and transducer 100 provides a signal indicative of the pressure in the external source. In other configurations, a second inlet tube leading into chamber 120 may be provided and connected to a second external source. In such configurations, transducer 100 provides a signal indicative of the differential pressure between the two external sources. In the illustrated transducer, the pressure sensor includes generally capacitor 128 as well as the electrode disk 122 and the structural members 124 used to support the electrode.

In the illustrated transducer, the contaminant filtration mechanisms include a particle trap system 140 and a baffle 150. Trap system 140 includes a baffle 141, a top view of which is shown in FIG. 2. Baffle 141 includes a central, circular, closed portion 142 and an annular region, defining a plurality of openings 144, disposed around closed portion 142. Openings 144 are formed as series of sectors evenly spaced about the baffle 141 in a circumferential direction, and are also arranged at different diameters radially. The diameter of central portion 142 is greater than that of inlet 104 and thereby blocks any direct paths from inlet tube 104 to the diaphragm 160. So, any contaminant in inlet tube 104 traveling towards diaphragm 160 can not follow a straight line path and must instead, after traveling the length of inlet tube 104, then travel in a direction generally perpendicular to the length of inlet tube 104 (the perpendicular direction being generally illustrated in FIG. 1B by the arrow L), enter an annular chamber region 146, and then pass through one of the peripheral openings 144. The peripheral openings 144 are sized to prevent relatively large particles (e.g., 250 microns and larger) from passing through the openings. Trap system 140 also includes the chamber 146, which is defined between baffle 141 and housing member 102a. Particles that can't pass through openings 144 tend to accumulate in, or become trapped in, chamber 146.

As noted above, transducer 100 also includes a baffle 150 to prevent contaminants from reaching the diaphragm 160. Baffle 150 is described in copending U.S. patent application Ser. No. 09/394,804. FIG. 3 shows a top view of baffle 150. As shown, baffle 150 is essentially a circular metal plate with a plurality of evenly spaced tabs 152 disposed about the circumference. Housing member 102a has stepped regions that come in contact with tabs 152 so as to support baffle 150 in the position shown in FIG. 1B.

Tabs 152 essentially define a plurality of annular sectors 154 (shown in FIGS. 1B and 3) having a width in the radial direction between the peripheral edge of baffle 150 and housing member 102a that is determined by the length of the tabs. Baffle 150 and housing member 102a define a region 158 through which any molecule must flow if it is to travel from inlet tube 104 to diaphragm 160. The region 158 is annular and is bounded above by baffle 150 and below by either baffle 141 or housing member 102a (where the terms "above" and "below" are with reference to FIG. 1B, but do not imply any absolute orientation of transducer 100). Molecules may enter region 158 via the peripheral openings 144 and may exit region 158 via the annular sectors 154 (shown in FIGS. 1B and 3) between the peripheral edge of baffle 150 and housing member 102a.

Region 158 is characterized by a length L and a gap g. The length L of region 158 (shown in FIG. 1B) is the distance between openings 144 and annular sectors 154. The gap g of region 154 is the distance between baffle 150 and housing member 102a. The aspect ratio of region 158 is defined as the ratio of a length L to the gap g. As taught in U.S. patent application Ser. No. 09/394,804, the aspect ratio is preferably greater than 50. The length L is preferably at least 1 cm, and preferably in the range of about 1–4 cm; the gap g is preferably no more than about 0.1 cm, and preferably in a range of about 0.025–0.1 cm.

When the pressure in chamber 130 is relatively low (e.g., less than 0.02 Torr), movement of material in chamber 130 is characterized by "molecular flow". Under such conditions, any molecule traveling through region 158 will likely collide with the surfaces of baffle 150 and housing member 102a many times prior to reaching, and passing through, an annular sector 154. The probability that a contaminant particle will become deposited on, or stuck to, a surface of baffle 150 or housing member 102a rather than continuing on through region 158 and passing thorough an annular sector 154 is an increasing function of the number of collisions the particle makes with the surfaces of baffle 150 and housing member 102a. Selecting the aspect ratio of the length L to the gap g to be greater than 50 insures that any contaminant traveling through region 158 is likely to become deposited on a surface of either baffle 150 or housing member 102a rather than continuing on through region 158, passing through an annular sector 154, and ultimately reaching the diaphragm 160.

In general, the goal of filtration mechanisms 108 (FIG. 1A), such as trap system 140 or baffle 150 (FIG. 1B) is to prevent contaminants from reaching the pressure sensor 106 (FIG. 1A). The use of trap system 140 and baffle 150 has been extremely effective at reducing the number of contaminants that reach the pressure sensor 106, and in particular from reaching diaphragm 160. However, some processes generate such a large volume of contaminants that even greater ability to filter out contaminants and reduce the likelihood that contaminants will reach the pressure sensor is desirable.

SUMMARY OF THE INVENTION

These and other objects are provided by an improved pressure transducer that includes a deposition trap in the fluid path between an external source of gas or fluid (e.g., gas line or deposition chamber) and the pressure sensor. The deposition trap may be disposed for example in the inlet tube or in a coupling between the inlet tube and the external source. The deposition trap provides a plurality of narrow channels through which material passes prior to reaching the diaphragm. The large number of narrow channels increases the likelihood that a contaminant particle will become stuck to one of the walls of the channels rather than passing through the deposition trap and reaching the pressure sensor.

Since it is located in the pathway between the external source and the transducer, the deposition trap may be easily added to preexisting transducers, removed or replaced.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE FIGURES

FIGS. 5A, 5B, and 5C are top, side and perspective views, respectively, of a deposition trap constructed in accordance with the invention.

DETAILED DESCRIPTION OF THE PREFERRED EMBODIMENTS

Figure 4B:
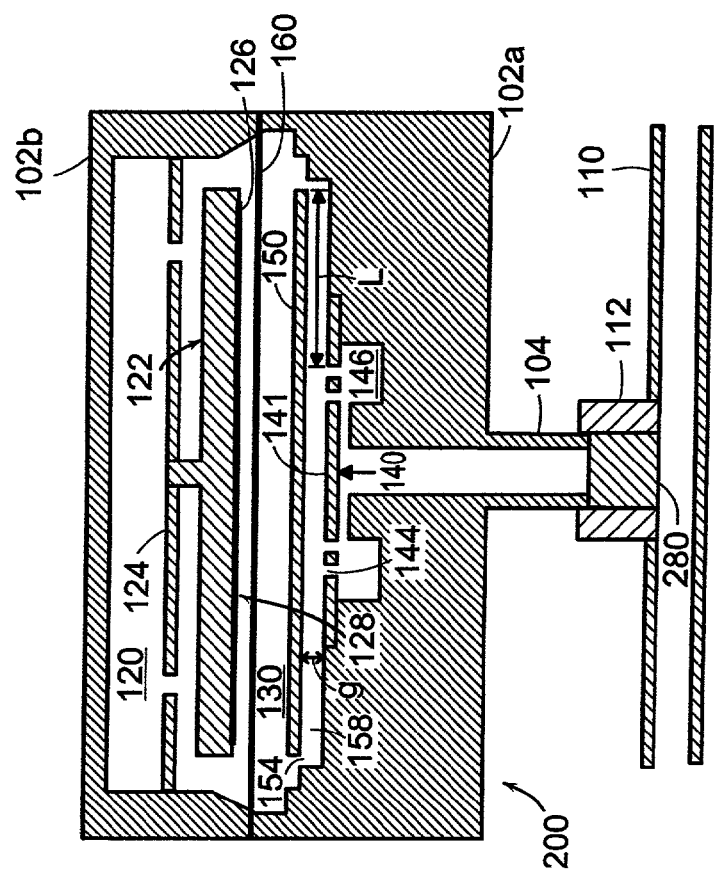
FIG. 4B is a more detailed sectional side view of a transducer constructed in accordance with the invention.
Figure 4A:
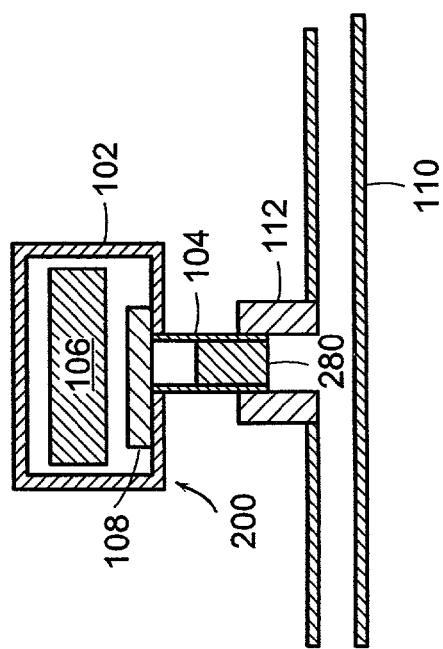
FIG. 4A is a sectional side view of a transducer constructed in accordance with the invention.

FIGS. 4A and 4B show a sectional side views of pressure transducers 200 constructed in accordance with the present invention. As shown, in addition to the components associated with prior art transducer 100, transducer 200 additionally includes a deposition trap 280. The deposition trap 280 is disposed in the path between the external source 110 (external source 110 may be for example a gas line or a deposition chamber) and the pressure sensor 106 and may for example be disposed in inlet tube 104, in coupling 112, or partially in both inlet tube 104 and coupling 112. As discussed in greater detail below, material (e.g., gas molecules or particle contaminants) passing through the pathway between the external source 110 and the pressure sensor 106 passes through deposition trap 280 prior to reaching the pressure sensor 106. In embodiments including a diaphragm 160, material passes through deposition trap 280 prior to reaching or contacting the diaphragm 160. As is also discussed in greater detail below, deposition trap 280 provides a contaminant trapping function so that contaminants entering trap 280 are likely to become trapped or stuck within trap 280. In operation, all molecules flowing through trap 280 collide with the walls of trap 280 many times. Whereas gas molecules bounce off the walls of trap 280 without sticking and eventually pass through trap 280, contaminant molecules tend to stick to the walls of trap 280 and thereby become trapped within trap 280.

Unlike prior art contaminant filtration systems such as trap system 140 or baffle 150, deposition trap 280 is not permanently attached to the housing of the transducer. Rather, deposition trap 280 is located in the pathway between the external source 110 and the pressure sensor 106.

This positioning of deposition trap 280 advantageously allows the deposition trap 280 be removed from the pathway and replaced (if, for example, accumulated contaminant depositions render trap 280 ineffective) without requiring any disassembly of transducer 200.

FIGS. 5A, 5B and 5C show top, side, and perspective views, respectively, of a preferred embodiment of deposition trap 280. In this illustrated embodiment, deposition trap 280 includes a hollow, outer, cylindrical casing 310, which is characterized by a diameter $D_c$ and a length $L_c$. Deposition trap 280 also includes a plurality of, or a bundle of, smaller diameter, hollow, cylindrical inner tubes 312 disposed within outer casing 310. Each of the inner tubes 312 is characterized by a length $L_i$ and a diameter $D_i$. Each of the inner tubes 312 is also characterized by an aspect ratio, which is the ratio of the length of the tube $L_i$ to the tube diameter $D_i$. In one preferred embodiment, the diameter $D_c$ and length $L_c$ of the outer casing 310 are substantially equal to nine to ten millimeters and fifty millimeters, respectively, and the diameter $D_i$ and length $L_i$ of all the inner tubes 312 are substantially equal to 0.75 millimeters and fifty millimeters, respectively. The aspect ratio of the inner tubes 312 is preferably greater than twenty.

As discussed above, deposition trap 280 is disposed in the pathway between the external source 110 and the pressure sensor 106. Trap 280 may be disposed in inlet tube 104, in coupling 112, or partially in both. Wherever it is disposed, at least the majority of material (e.g., gas molecules or contaminant particles) passing through the pathway into transducer 200 passes through the hollow inner tubes 312 or through hollow spaces 314 defined between the inner tubes 312. When the fluid pressure within the pathway is relatively low (e.g., less than 0.02 Torr), flow of material in the pathway may be characterized as "molecular flow". Accordingly, under these conditions, since each hollow inner tube 312 (and the hollow spaces 314 between the tubes 312) is characterized by a relatively large aspect ratio, a molecule passing through any one of the tubes 312 is likely to contact the walls of the tube many times prior to traveling the full length of the tube and exiting the tube. The likelihood that a contaminant particle passing through deposition trap 280 will become deposited on, or stuck to, a wall of one of the inner tubes 312 rather than passing entirely through trap 280 increases every time the particle collides with one of the tubes 312. So, increasing the likelihood that any molecule passing through the inner tubes 312 must contact the walls of the tube many times before passing through the tube advantageously increases the likelihood that a contaminant particle passing through deposition trap 280 will become deposited on, or stuck to, the walls of tube 312 rather than passing through and exiting tube 312. Deposition trap 280 thereby advantageously traps a large portion of contaminants, or prevents a large portion of the contaminants in the gas (the pressure of which is being measured by transducer 200) from reaching the pressure sensor 106.

The outer diameter of casing 310 may be selected so that casing 310 fits within inlet tube 104. Outer casing 310 may also define at one end a lip 320 having an outer diameter greater than the inner diameter of inlet tube 104. As discussed below, lip 320 may be used to control the position of deposition trap 280 within the pathway.

The inner tubes 312 may or may not be characterized by the same diameter, however, the diameter of all inner tubes is preferably substantially smaller than the diameter $D_c$ of outer casing 310 (as indicated in FIG. 5C). The lengths of the inner tubes 312 may be substantially equal to the length $L_c$ of outer casing 310. However, in other embodiments, the lengths of the inner tubes 312 may be unequal, and the tubes 312 may be longer or shorter than the length $L_c$ of outer casing 310.

While the particular dimensions of the inner tubes 312 are not critical, it will be appreciated that deposition trap 280 advantageously increases the surface area of the path through which material flows as it passes into transducer 200. For example, if deposition trap 280 were not present, the surface area of the path through which material passed prior to entering the chamber 130 would be the area of the inner wall of inlet tube 104 and the area of the inner wall of coupling 112. However, when deposition trap 280 is present, the surface area of the path through which material flows on its way towards sensor 106 includes the surface area of all the inner tubes 312, and this area far exceeds the area of inlet tube 104 and coupling 112 alone. Increasing the surface area of the path advantageously increases the likelihood that contaminants will become deposited on, or stuck to, one of the surfaces of trap 280 rather than passing through trap 280.

Structures similar to trap 280 (i.e., a structure including a plurality of hollow tubes disposed within an outer casing) have been used in the prior art to create laminar flows in mass flow meters. However, such structures have not been used in pressure transducers and have not been used to trap contaminants and prevent contaminants from reaching a diaphragm.

Figure 6C:
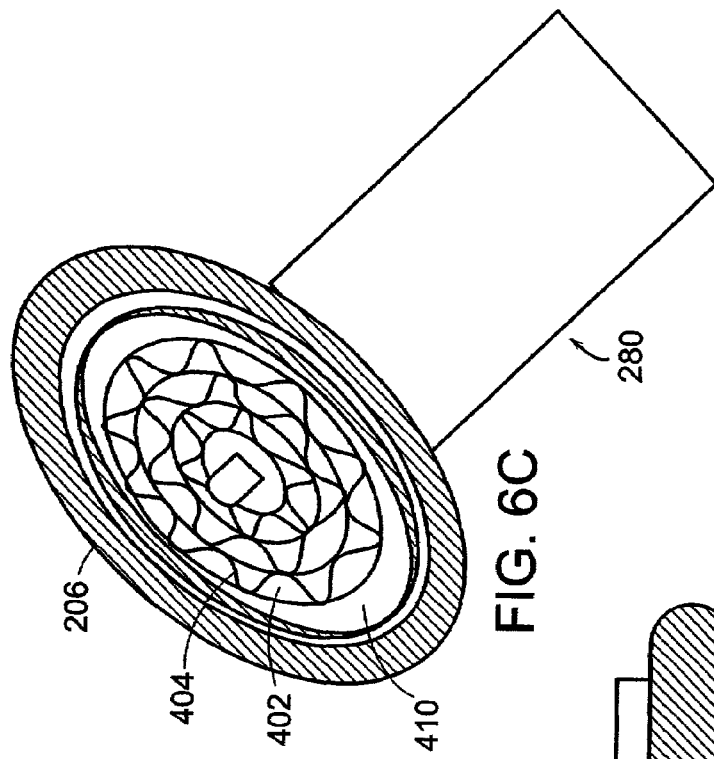
FIGS. 6A, 6B, and 6C are top, side and perspective views, respectively, of a another deposition trap constructed in accordance with the invention.
Figure 6B:
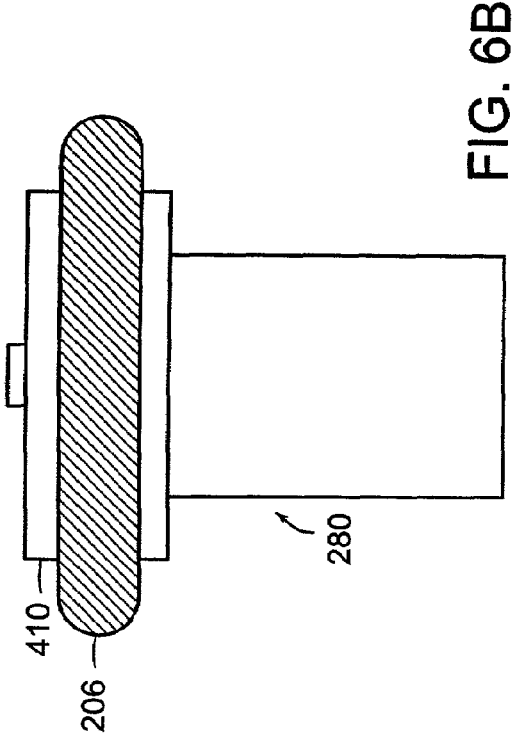
Figure 6A:
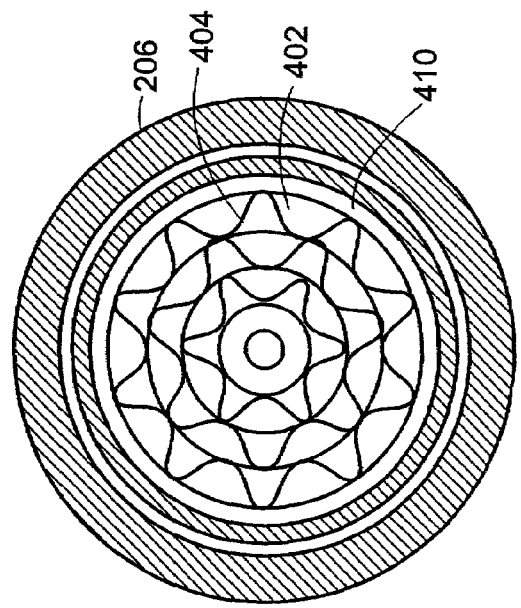
Figure 7:
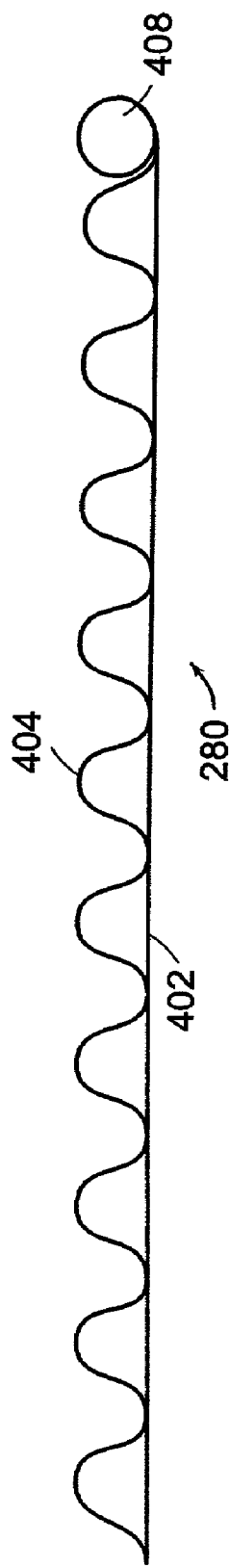
FIG. 7 is a side view of the deposition trap shown in FIGS. 6A, 6B, and 6C at an early stage of fabrication.

FIGS. 6A, 6B and 6C show top, side, and perspective views, respectively of another embodiment of deposition trap 280. FIG. 7 shows a top view of one embodiment of trap 280 at an early stage of fabrication. As shown in FIG. 7, trap 280 includes a sheet of flat metal 402, a sheet of corrugated metal 404, and a mandrill (or post) 408. Trap 280 is formed by winding sheets 402, 404 around the mandrill 408 to form a tube with multiple small diameter channels.

The embodiment shown in FIGS. 5A, 5B, and 5C is similar to the embodiment shown in FIGS. 6A, 6B, and 6C. In each case, the trap includes an outer tube or casing, and a plurality of smaller individual channels, or paths, are defined within the outer casing. In the case of FIGS. 5A–5C, the individual channels are defined by cylindrical tubes 312. In the case of FIGS. 6A–6C, the individual channels are defined by spaces between the flat sheet 402 and the corrugated sheet 404. In either case, the presence of the smaller inner channels greatly increases the surface area of the path through which material passes when passing through the deposition trap 280.

As shown in FIG. 6B, the top portion of trap 280 may include a centering ring 410, which has a larger diameter than the rest of trap 280. Centering ring 410 may also define a notch or groove (not shown) for holding an O-ring 206. O-ring 206 may be used to provide a seal between trap 280 and inlet tube 104 to insure that material passing through inlet tube 104 actually passes through trap 280 instead of following a path between the inner diameter of inlet tube 104 and the outer diameter of trap 280.

Figure 1B:
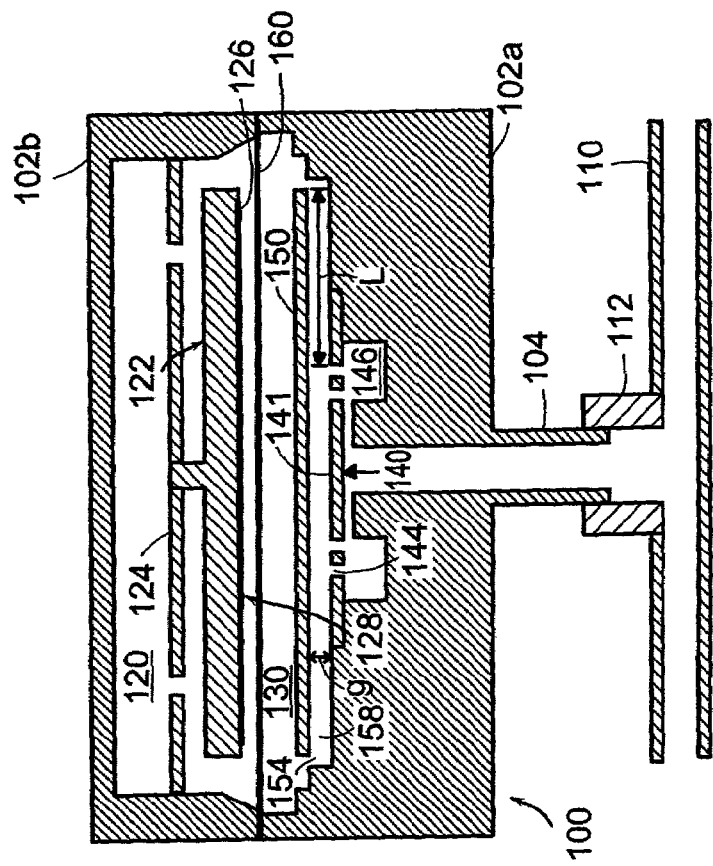
FIG. 1B is a more detailed sectional side view of a prior art capacitive pressure transducer.
Figure 1A:
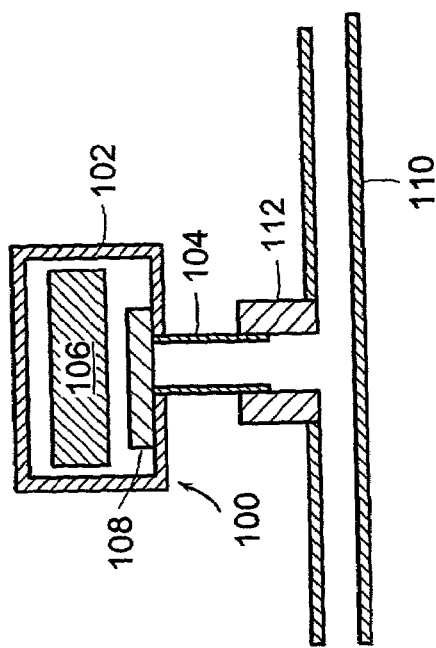
FIG. 1A is a sectional side view of an assembled prior art capacitive pressure transducer.
Figure 2:
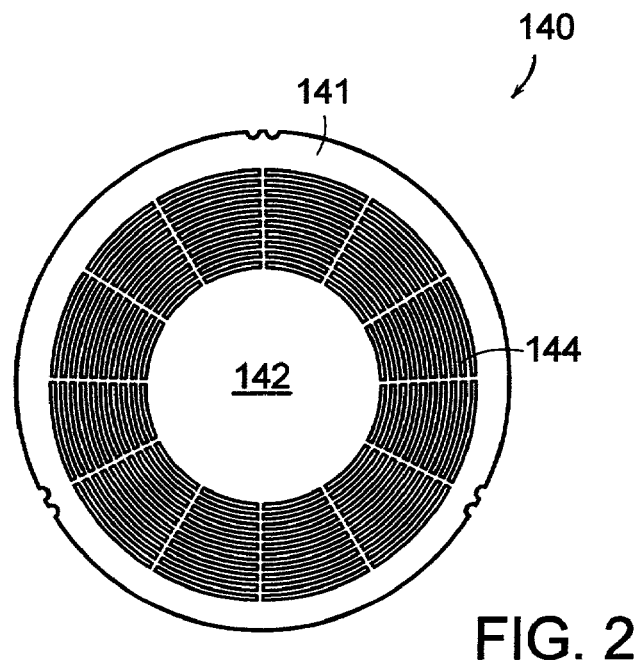
FIG. 2 is a top view of the baffle of the trap system shown in FIG. 1B.
Figure 3:
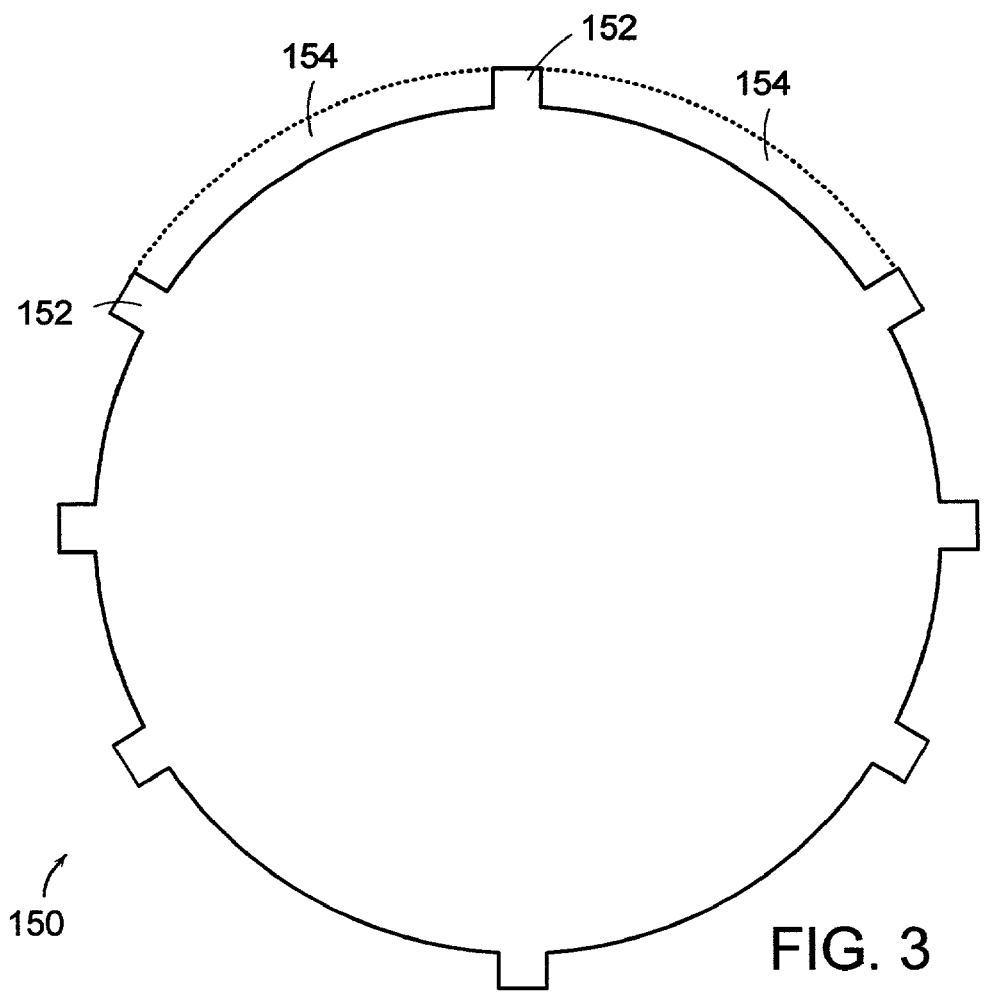
FIG. 3 is a top view of the baffle of the transducer shown in FIG. 1B.
Figure 8A:
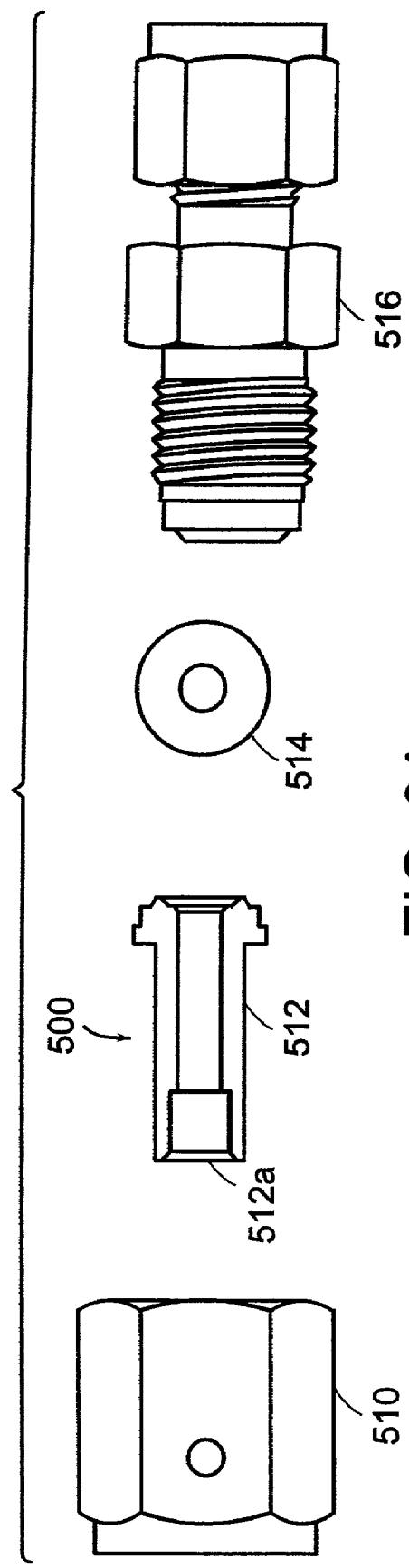
FIG. 8A is an exploded view of a prior art locking mechanism used to connect pressure transducers to a gas line.
Figure 8B:
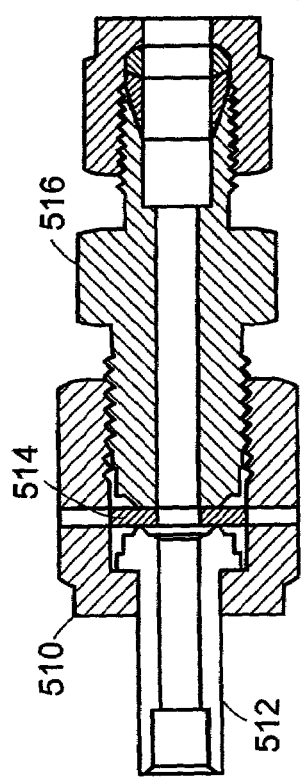
FIG. 8B is a side view of the locking mechanism shown in FIG. 8A when assembled.

FIG. 8A is an exploded view of a prior art coupling 500, and FIG. 8B is a side view of coupling 500 when assembled. Coupling 500 is well known for use with pressure transducers and couplings of the general form of coupling 500 may be purchased from the Swagelok Companies of Solon, Ohio. As shown, coupling 500 includes a female nut 510, a gland 512, a washer 514, and a body 516. When fully assembled, gland 512 is attached to the inlet tube (e.g., as shown at 104 in FIGS. 1A and 1B) of a pressure transducer and body 516 is attached to an external source of gas or fluid, the pressure of which is to be measured. Normally, the inlet tube is inserted telescopically into the gland at end 512a and then welded so that the outer wall of the inlet tube is bonded to the inner wall of the gland.

Figure 8C:
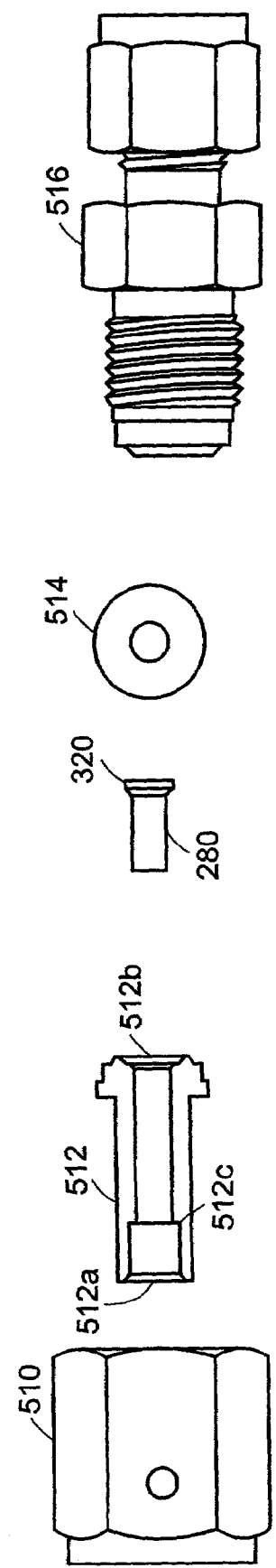
FIG. 8C is an exploded view of the locking mechanism of FIGS. 8A and 8B when modified to include a deposition trap in accordance with the present invention.

FIG. 8C is an exploded view of a coupling of the type shown in FIGS. 8A and 8B that incorporates a deposition trap 280. As shown, deposition trap 280 is sized so that it fits, or slides into, the inner channel defined by gland 512, however, the outer diameter of lip 320 is larger than the inner diameter of gland 512. The outer diameter of lip 320 is also larger than the inner diameter of the hole defined by washer 514. When fully assembled, the deposition trap 280 is held snugly in place by washer 514 and gland 512. Lip 320 restricts the amount that trap 280 can slide into gland 512, and washer 514 prevents trap 280 from sliding into body 516. As shown, the inner passage defined by gland 512 may have a wide section (or a large diameter section) extending from end 512a to a point 512c, and a narrow section (or a narrow diameter section) extending from end 512b to point 512c. In one embodiment, the inlet tube of the transducer extends into the wide section of gland 512 and the deposition trap 280 extends into the narrow section.

It will be appreciated that FIG. 8C shows how a deposition trap constructed according to the invention may be easily added to preexisting pressure transducer assemblies. The trap is simply held within preexisting couplings used to connect the transducer to an external source of gas or fluid. As noted above, one advantage of deposition trap 280 is that it is not permanently fixed to the transducer housing (as was the case with prior art trap system 140 and baffle 150 shown in FIG. 1B). Rather, instead of being permanently affixed to the transducer housing, a deposition trap 280 may be added to a preexisting transducer simply by including it in the couplings normally used to connect the transducer to a gas line. Also, if a deposition trap 280 becomes clogged (e.g., by accumulation of a large number of contaminants) it may be replaced simply without requiring any disassembly of the transducer itself.

In the configuration shown in FIG. 8C, the deposition trap may extend only into the narrow region of gland 512, or it may further extend into the wide region of gland 512 and the inlet tube 104 of the transducer. As long as the deposition trap is positioned somewhere in the path between the external source of gas or fluid and the transducer, it will perform the function of filtering out contaminants and preventing those contaminants from reaching the diaphragm.

In addition to allowing the deposition trap to be easily added, removed, or replaced without requiring disassembly of the transducer itself, in the case of heated transducers there is another advantage to locating the deposition trap in the inlet tube, or between the external source and the inlet tube. In such cases, the deposition trap may be held at a lower temperature than the transducer and this lower temperature can further increase the likelihood that contaminants will condense out, or become deposited in, the deposition trap.

Figure 9A:
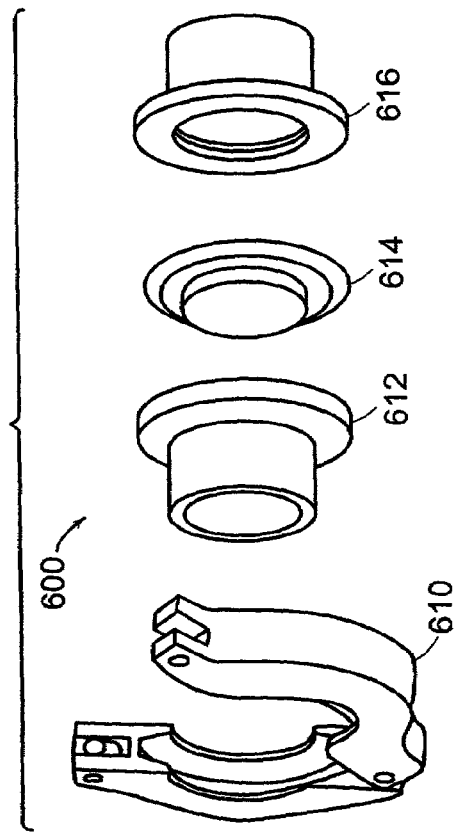
FIGS. 9A and 9B are exploded and top views, respectively, of another prior art locking mechanism used to connect pressure transducers to a gas line.
Figure 9B:
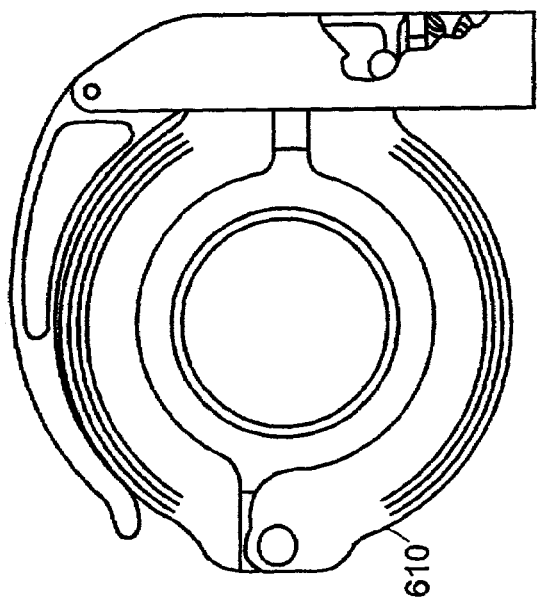

FIGS. 9A and 9B show, respectively, exploded and top views of a different type of prior art coupling 600 for interconnecting an external source of gas or fluid to a pressure transducer. Coupling 600 is known as a ISO-KF 16 type flange and is commercially available from the HPS Division of MKS Instruments of Boulder, Colo. As shown, coupling 600 includes a clamp 610, a flange 612, an O-ring 614, and another flange 616. When assembled, clamp 610 holds flanges 612, 616 together with O-ring 614 held between, and forming a seal between, the two flanges 612, 616. In operation, one of the flanges may be connected to a transducer and the other flange may be connected to an external source of gas or fluid.

Figure 9C:
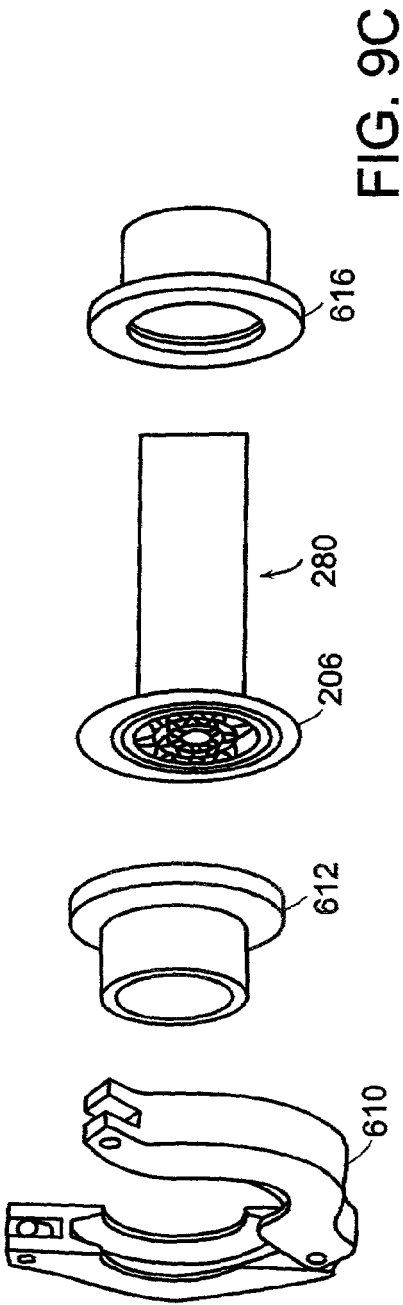
FIG. 9C is an exploded view of the locking mechanism of FIGS. 9A and 9B when modified to include a deposition trap in accordance with the present invention.

As shown in FIG. 9C, coupling 600 may be easily modified to house a deposition trap constructed according to the invention. As shown in FIG. 9C, O-ring 614 is simply replaced with a deposition trap of the type shown in FIGS. 6A, 6B, and 6C, having a sealing O-ring disposed at one end of the trap. Again, FIG. 9C shows how deposition traps constructed according to the invention may be easily used with preexisting transducer assemblies simply be adding the deposition trap to the coupling used to interconnect the external source and the transducer.

Since certain changes may be made in the above apparatus without departing from the scope of the invention herein involved, it is intended that all matter contained in the above description or shown in the accompanying drawing shall be interpreted in an illustrative and not a limiting sense. For example, it will be appreciated that deposition trap 280 may be used in pressure transducers that include other contaminant filtration mechanisms (such as trap system 140 or baffle 150), and that deposition trap 280 may also be used in transducers that do not include other contaminant filtration mechanisms. It will further be appreciated that there are numerous ways to construct a deposition trap according to the invention. For example, whereas FIGS. 5A, 5B, and 5C show a plurality of tubes disposed within an outer casing, the deposition trap could alternatively be constructed by drilling (or otherwise providing) a plurality of holes inside a cylindrical plug. In this case, the holes would provide channels similar to the channels provided by the inner tubes of the FIGS. 5A, 5B, and 5C embodiment. As another example, the outer casing of the FIGS. 5A, 5B, and 5C embodiment could be replaced with a band or strap used to hold the bundle of inner tubes together. Other variations of the deposition trap are also embraced within the invention. Deposition trap 280 provides a plurality of narrow channels. It will be appreciated that there are a wide variety of ways to construct a trap that provides such a plurality of narrow channels all of which are embraced within the invention.

What is claimed is:

1. A pressure transducer assembly, comprising:
   A) a housing;
   B) a pressure sensor disposed in the housing;
   C) a coupling between the housing and an external source of gas or fluid, the coupling and housing establishing a sealed pathway between the external source and the pressure sensor;
   D) a deposition trap disposed in the pathway, the deposition trap defining a plurality of channels formed by a plurality of tubes, each of the tubes having an inner surface and an outer surface, and each of the channels being narrower than the pathway, wherein the particulates can be deposited on at least a portion of the inner and outer surface of the tubes during operation of the transducer assembly.

2. An assembly according to claim 1, wherein each of the inner tubes providing one of the channels and at least a portion of the outer surface of the inner tube provides a deposition trap surface.

3. An assembly according to claim 2, the deposition trap including an outer casing, each of the inner tubes being disposed within the outer casing.

4. An assembly according to claim 1, each of the channels being characterized by an aspect ratio, the aspect ratio of each channel being a ratio of a length of the channel to a width of the channel, the aspect ratio of each channel being greater than twenty.

5. An assembly according to claim 1, the housing defining an inlet tube, the coupling attaching to the inlet tube.

6. An assembly according to claim 5, at least part of the deposition trap being disposed in the inlet tube.

7. An assembly according to claim 5, at least part of the deposition trap being disposed outside the inlet tube.

8. An assembly according to claim 1, the pressure sensor including a flexible diaphragm.

9. An assembly according to claim 1, a pressure of the gas or fluid in the pathway being less than 0.02 Torr.

10. An assembly according to claim 1, the deposition trap being mounted in the pathway without welding.

11. A transducer according to claim 1 wherein the channels have a length and a diameter and the length of the channel is longer than the diameter of the channel.

12. A transducer according to claim 1 wherein the plurality of channels each have a cross sectional area and a length and the cross sectional area is substantially constant for a substantial part of the length of each of the plurality of the channels.

13. A transducer according to claim 1 wherein at least one of the plurality of channels has a cross sectional area that is constant along the length of the trap.

14. A transducer according to claim 1 wherein the channels are adapted for very low pressure and molecules are more likely to hit the wall of a channel than another molecule.

15. A transducer according to claim 1 wherein the channels have a length and a cross sectional area and the cross-sectional area is non circular along the length of the channels.

16. A pressure transducer, comprising:
(A) a pressure sensor;
(B) a coupling defining an internal passage, the coupling being connectable to an external source of gas or fluid, a pressure of the gas or fluid being less than 0.02 Torr, the internal passage providing at least a portion of a sealed pathway between the external source and the sensor when the coupling is connected to the external source;
(C) a deposition trap defining a plurality of channels formed of a plurality of tubes, the tubes having an inner surface and an outer surface, the structure being mounted without welding to the coupling such that molecules flowing through the internal passage pass through the channels before reaching the sensor, wherein the particulates can be deposited on at least a portion of the inner and outer surface of the tubes during operation of the transducer assembly.

17. A transducer according to claim 16, the pressure sensor including a flexible diaphragm and a conductor, the diaphragm and conductor being characterized by a capacitance, the capacitance changing in response to flexing of the diaphragm, the diaphragm flexing in response to changes in pressure of the gas or fluid in the external source when the coupling is connected to the external source.

18. A transducer according to claim 17, molecules flowing through the internal passage to the diaphragm pass through the channels before reaching the diaphragm.

19. A transducer according to claim 16, the coupling comprising an inlet tube.

20. A transducer according to claim 16, wherein at least a portion of the outer surface of the plurality of tubes provides a deposition trap surface.

21. A transducer according to claim 20, the channels include spaces between the tubes.

22. A transducer according to claim 16, at least some of the channels being substantially cylindrical.

23. A transducer according to claim 16 wherein the channels have a length and a diameter and the length of the channel is longer than the diameter of the channel.

24. A transducer according to claim 16 wherein the plurality of channels each have a cross sectional area and a length and the cross sectional area is substantially constant for a substantial part of the length of each of the plurality of the channels.

25. A transducer according to claim 16 wherein at least one of the plurality of channels has a cross sectional area that is constant along the length of the structure.

26. A transducer according to claim 16 wherein the channels are adapted for very low pressure and molecules are more likely to hit the wall of a channel than another molecule.

27. A transducer according to claim 16 wherein the channels have a length and a cross sectional area and the cross-sectional area is non circular along the length of the channels.

28. A transducer comprising:
(A) a housing;
(B) a flexible diaphragm disposed in the housing, the diaphragm defining a first chamber and a second chamber within the housing;
(C) a conductor disposed in the second chamber, the diaphragm and conductor being characterized by a capacitance;
(D) an inlet tube configured to provide at least a portion of a sealed path between the first chamber and an external source of gas or fluid, a pressure of the gas or fluid in the external source being less than 0.02 Torr, the capacitance changing in response to changes in the pressure; and
(E) a deposition trap defining a plurality of channels formed of a plurality of tubes, each of the tubes having an inner surface and an outer surface, each of the channels being narrower than the path, the structure being mounted without welding in the path such that molecules flowing from the external source to the first chamber pass through the channels, wherein the particulates can be deposited on at least a portion of the inner and outer surface of the tubes during operation of the transducer assembly.

29. A transducer according to claim 28, at least some of the channels being cylindrical.

30. A transducer according to claim 28, wherein the structure includes a deposition trap surface on at least a portion of the outer surface of the plurality of tubes.

31. A transducer according to claim 28 wherein the channels have a length and a diameter and the length of the channel is longer than the diameter of the channel.

32. A transducer according to claim 28 wherein the plurality of channels each have a cross sectional area and a length and the cross sectional area is substantially constant for a substantial part of the length of each of the plurality of the channels.

33. A transducer according to claim 28 wherein at least one of the plurality of channels has a cross sectional area that is constant along the length of the structure.

34. A transducer according to claim 18 wherein the channels are adapted for very low pressure and molecules are more likely to hit the wall of a channel than another molecule.

35. A transducer according to claim 18 wherein the channels have a length and a cross sectional area and the cross-sectional area is non circular along the length of the channels.

36. A pressure transducer assembly, comprising:
A) a housing;
B) a pressure sensor disposed in the housing;
C) a coupling between the housing and an external source of gas or fluid, the coupling and housing establishing a sealed pathway between the external source and the pressure sensor;
D) a deposition trap disposed in the pathway, the deposition trap defining a plurality of tubes formed by a rolled corrugated sheet forming a plurality of trapping surfaces, each of the channels being narrower than the pathway.

* * * * *